(12) United States Patent
Suzuki

(10) Patent No.: US 9,189,179 B2
(45) Date of Patent: Nov. 17, 2015

(54) IMAGE PROCESSING DEVICE AND PORTABLE TERMINAL

(71) Applicant: Nobuhiko Suzuki, Nagoya (JP)

(72) Inventor: Nobuhiko Suzuki, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 52 days.

(21) Appl. No.: 13/626,438

(22) Filed: Sep. 25, 2012

(65) Prior Publication Data

US 2013/0083358 A1 Apr. 4, 2013

(30) Foreign Application Priority Data

Sep. 30, 2011 (JP) ................. 2011-217502

(51) Int. Cl.
*G06F 15/00* (2006.01)
*G06F 3/12* (2006.01)
(Continued)

(52) U.S. Cl.
CPC ............ *G06F 3/1204* (2013.01); *G06F 3/0346* (2013.01); *G06F 3/1236* (2013.01); *G06F 3/1253* (2013.01); *G06F 3/1284* (2013.01); *G06F 3/1292* (2013.01); *H04N 1/00395* (2013.01); *H04N 1/00411* (2013.01); *H04N 1/00419* (2013.01); *H04N 1/00474* (2013.01); *H04N 1/00482* (2013.01); *H04N 1/2338* (2013.01); *H04W 76/02* (2013.01);
(Continued)

(58) Field of Classification Search
CPC ................. G06F 220/1637; H04N 2201/006; H04N 2201/0041
USPC ........................................................ 358/1.15
See application file for complete search history.

(56) References Cited

U.S. PATENT DOCUMENTS 6,573,883 B1 6/2003 Bartlett
6,809,759 B1 10/2004 Chiang
(Continued)

FOREIGN PATENT DOCUMENTS

EP 1489488 A2 12/2004
EP 1677520 A1 7/2006
(Continued)

OTHER PUBLICATIONS

Extended EP Search Report mailed Feb. 13, 2013, EP Appln. 12185687.6.
(Continued)

*Primary Examiner* — Saeid Ebrahimi Dehkord
(74) *Attorney, Agent, or Firm* — Banner & Witcoff, Ltd.

(57) ABSTRACT

An image processing device configured to establish bidirectional communication with a portable terminal using short-range wireless communication includes: a processor; and a memory that stores computer-readable instructions therein. The computer-readable instructions may cause the image processing device to transmit first selection information to the terminal during a first communication session, the first selection information including information representing a plurality of first setting options for image processing carried out by the device; receive first item data from the terminal during a second communication session established after the first communication session is disconnected, the first item data representing a particular first setting option designated by a user of the terminal from among the plurality of first setting options; and carry out particular image processing in accordance with the particular first setting option represented by the first item data.

17 Claims, 10 Drawing Sheets

(51) Int. Cl.
*G06F 3/0346* (2013.01)
*H04N 1/00* (2006.01)
*H04N 1/23* (2006.01)
*H04W 76/02* (2009.01)
*H04W 84/18* (2009.01)

(52) U.S. Cl.
CPC ........ *G06F 3/122* (2013.01); *G06F 2200/1637* (2013.01); *H04N 2201/006* (2013.01); *H04N 2201/0041* (2013.01); *H04N 2201/0075* (2013.01); *H04N 2201/0094* (2013.01); *H04W 84/18* (2013.01)

(56) References Cited

U.S. PATENT DOCUMENTS

| | | | |
|---|---|---|---|
| 2004/0053573 | A1 | 3/2004 | Karusawa |
| 2004/0263870 | A1 | 12/2004 | Itoh et al. |
| 2006/0293765 | A1 | 12/2006 | Tanaka et al. |
| 2007/0073929 | A1 | 3/2007 | Takayama et al. |
| 2007/0109417 | A1 | 5/2007 | Hyttfors et al. |
| 2007/0176898 | A1 | 8/2007 | Suh |
| 2007/0285498 | A1 | 12/2007 | Shiomi |
| 2007/0291298 | A1* | 12/2007 | Kodimer ............ 358/1.15 |
| 2009/0033972 | A1* | 2/2009 | Kato ............ 358/1.13 |
| 2009/0103124 | A1* | 4/2009 | Kimura et al. ............ 358/1.15 |
| 2009/0117849 | A1 | 5/2009 | Mizoguchi |
| 2009/0298429 | A1 | 12/2009 | Nakagawa |
| 2010/0037184 | A1 | 2/2010 | Sie |
| 2011/0026068 | A1 | 2/2011 | Yoshida |
| 2011/0058052 | A1 | 3/2011 | Bolton et al. |
| 2011/0292445 | A1 | 12/2011 | Kato |

FOREIGN PATENT DOCUMENTS

| | | |
|---|---|---|
| JP | 2001238029 | 8/2001 |
| JP | 2004112243 | 4/2004 |
| JP | 2004193949 A | 7/2004 |
| JP | 2004348616 | 12/2004 |
| JP | 2004364145 | 12/2004 |
| JP | 2005092667 A | 4/2005 |
| JP | 2008092077 A | 4/2008 |
| JP | 2008092304 | 4/2008 |
| JP | 2010011362 A | 1/2010 |
| JP | 2010055198 A | 3/2010 |
| WO | 2004054241 A1 | 6/2004 |
| WO | 2008118642 A1 | 10/2008 |
| WO | 2010107125 A1 | 9/2010 |

OTHER PUBLICATIONS

Extended European Search Report for European Application No. 12185685.0 mailed Dec. 13, 2013.
Non-Final Office Action dated Feb. 5, 2014 for U.S. Appl. No. 13/626,383.
US Final Office Action issued in U.S. Appl. No. 13/626,383 on Nov. 6, 2014.
Advisory Action issued on Jan. 29, 2015 in related U.S. Appl. No. 13/626,383.
Mar. 6, 2015—(US) Non-Final Office Action—U.S. Appl. No. 13/626,383.
Japanese Office Action issued May 7, 2015 in Japanese Application No. 2011-217501.
Japanese Office Action issued Jun. 2, 2015 in Japanese Application No. 2011-217502.

* cited by examiner

IMAGE PROCESSING DEVICE AND PORTABLE TERMINAL

CROSS-REFERENCE TO RELATED APPLICATION

This application claims priority from Japanese Patent Application No. 2011-217502, filed on Sep. 30, 2011, which is incorporated herein by reference.

FIELD OF DISCLOSURE

The technique disclosed in this description relates to an image processing device and a portable terminal which are capable of communicating bidirectionally using a short-range wireless communication.

BACKGROUND

An image forming device provided with plural keys has been proposed. A user can designate processes to be carried out by the image forming device and set values to be used in the processes by manipulating the plural keys.

SUMMARY

In this description, a technique to enable a user to easily designate setting options for the carrying out of the image processing using a portable terminal is provided.

The technique disclosed in this description may include an image processing device which is capable of communicating bidirectionally with a portable device using short-range wireless communication. The image processing device may include a device-side transmission unit, a device-side reception unit, and a process execution unit. The image processing device may establish a short-range wireless communication session with the portable terminal when a first distance, which is a distance to the portable terminal, is changed from longer than a radio wave range to shorter than the radio wave range and disconnects the communication session when the first distance is changed from shorter than the radio wave range to longer than the radio wave range. The device-side transmission unit may transmit first selection information to the portable terminal during a first communication session. The first selection information may include information which represents a plurality of first setting options for the image processing carried out by the image processing device. The device-side reception unit may receive first item data from the portable terminal during a second communication session which is established after the first communication session is disconnected. The first item data may represent a particular first setting option designated by a user of the portable terminal from among the plurality of first setting options. The process execution unit may carry out particular image processing in accordance with the particular first setting option represented by the first item data.

According to this configuration, the user may designate the particular first setting option after the first selection information is transmitted from the image processing device during the first communication session in a state in which the portable terminal is kept away from the image processing device (i.e., a state in which the first communication session is disconnected). This configuration may enable the user to more easily designate the particular first setting option as compared with a configuration which requires the user to designate a setting option with the portable terminal being close to the image processing device.

The device-side transmission unit may further transmit second selection information to the portable terminal during the second communication session. The second selection information may include information which represents a plurality of second setting options related to the particular first setting option. The device-side reception unit may further receive second item data from the portable terminal during a third communication session which is established after the second communication session is disconnected. The second item data represents a particular second setting option designated by the user from among the plurality of second setting options. The process execution unit may carry out particular image processing further in accordance with the particular second setting option represented by the second item data. According to this configuration, the user may designate the particular second setting option after the second selection information is transmitted from the image processing device during the second communication session in a state in which the portable terminal is kept away from the image processing device (i.e., a state in which the second communication session is disconnected). Therefore, the user may designate the particular second setting option more easily.

The device-side transmission unit may further transmit the second selection information and third selection information to the portable terminal during the second communication session. The third selection information may include information which represents a plurality of third setting options related to the particular second setting option. The device-side reception unit may further receive the second item data and third item data from the portable terminal during the third communication session. The third item data represents a particular third setting option designated by the user from among the plurality of third setting options. The process execution unit may carry out particular image processing further in accordance with the particular third setting option represented by the third item data. According to this configuration, the image processing device may carry out the particular image processing properly in accordance with the second and third item data which are received during the third communication session.

The plurality of second setting options may be a lower-level setting option of the particular first setting option. According to this configuration, the image processing device may carry out particular image processing properly in accordance with the first item data which represents the particular first setting option and in accordance with the second item data which represents a lower-level setting option of the particular first setting option.

The device-side reception unit may further receive, from the portable terminal, particular identification information for identifying the portable terminal during the second communication session. The image processing device may further include a storage control unit which correlates the particular identification information with the first item data and cause the correlated particular identification information and the first item data to be stored in memory of the image processing device if the particular identification information and the first item data are received during the second communication session. The device-side reception unit may further receive the particular identification information from the portable terminal during the third communication session. If the second item data and the particular identification information are received during the third communication session, the storage control unit may further correlate the particular identification information already stored in the memory with the first item data and cause the second item data to be stored in the memory. The process execution unit may carry out particular image processing with reference to the first item data and the second item data which are correlated with the particular identification information in the memory. According to this configuration, the image processing device may recognize that the first and second item data have been received from which portable terminal, even if the second and third communication sessions are disconnected so that the first and second item data are correlated with the particular identification information and are stored in the memory. Therefore, the image processing device may carry out particular image processing properly in accordance with the first and second item data received from the particular portable terminal.

A control method, a computer program and a computer-readable recording medium in which the computer program is stored for the implementation of the above-described image processing device are also novel and useful.

The technique disclosed in this description may include a portable terminal which is capable of carrying out bidirectional communication with an image processing device using short-range wireless communication. The portable terminal may include a terminal-side reception unit, a display control unit, a selection unit, and a terminal-side transmission unit. The portable terminal may establish a short-range wireless communication session with the image processing device when a first distance, which is a distance to the image processing device, is changed from longer than a radio wave range to shorter than the radio wave range and disconnects the communication session when the first distance is changed from shorter than the radio wave range to longer than the radio wave range. The terminal-side reception unit may receive first selection information from the image processing device during a first communication session. The first selection information may include information which represents a plurality of first setting options for the image processing carried out by the image processing device. The display control unit may cause a first selection screen to be displayed on a display unit of the portable terminal in accordance with the first selection information. The first selection screen may represent at least one first setting option from among the plurality of first setting options. The selection unit may select a particular first setting option from among the plurality of first setting options if the user designates the particular first setting option from among the plurality of first setting options in accordance with the first selection screen in a state in which the first communication session is disconnected. The terminal-side transmission unit may transmit first item data which represents particular first setting option to the image processing device during the second communication session which is established after the first communication session is disconnected.

According to this configuration, the user may designate the particular first setting option after the first selection information is received using the first communication session in a state in which the portable terminal is kept away from the image processing device (i.e., a state in which the first communication session is disconnected). This configuration may enable the user to more easily designate the particular first setting option as compared with a configuration which requires the user to designate a setting option with the portable terminal being close to the image processing device.

The terminal-side reception unit may further receive second selection information from the image processing device during the second communication session. The second selection information may include information which represents a plurality of second setting options related to the particular first setting option. The display control unit may further cause a second selection screen to be displayed on the display unit in accordance with the second selection information. The second selection screen represents at least one second setting option among the plurality of second setting options. The selection unit may further select a particular second setting option from among the plurality of second setting options if the user designates the particular second setting option from among the plurality of second setting options in accordance with the second selection screen in a state in which the second communication session is disconnected. The terminal-side transmission unit may further transmit second item data to the image processing device during a third communication session which is established after the second communication session is disconnected. The second item data represents a particular second setting option. According to this configuration, the user may designate the particular second setting option after the second selection information is received during the second communication session in a state in which the portable terminal is kept away from the image processing device (i.e., a state in which the second communication session is disconnected). Therefore, the user may designate the particular second setting option more easily.

The terminal-side transmission unit may further transmit particular identification information for identifying the portable terminal to the image processing device during the second communication session. The terminal-side transmission unit may further transmit the particular identification information to the image processing device during the third communication session. According to this configuration, the image processing device may recognize that the first and second item data are received from the particular portable terminal, even if the second and third communication sessions are disconnected.

The terminal-side reception unit may receive the second selection information and third selection information from the image processing device during the second communication session. The third selection information includes information which represents a plurality of third setting options related to the particular second setting option. The display control unit may further cause a third selection screen to be displayed on the display unit in accordance with the third selection information. The third selection screen represents at least one third setting option from among the plurality of third setting options. The selection unit may further select a particular third setting option from among the plurality of third setting options if the user designates the particular third setting option from among the plurality of third setting options in accordance with the third selection screen in a state in which the second communication session is disconnected. The terminal-side transmission unit may further transmit the second item data and the third item data which represents a third particular setting option to the image processing device using the third communication session. According to this configuration, the user may designate the particular second setting option and the particular third setting option after the second and third selection information are received using the second communication session in a state in which the portable terminal is kept away from the image processing device (i.e., a state in which the second communication session is disconnected). Therefore, the user may designate the particular second setting option and the particular third setting option more easily.

The first selection information may include plural pieces of text data which represent a plurality of first setting options. The display control unit may generate a first selection screen using the plural pieces of text data and cause the generated first selection screen to be displayed on the display unit. According to this configuration, the amount of data of the first selection information may be smaller than that in a configuration in which the first selection information includes image data which represents a plurality of first setting options. Therefore, the amount of communication data between the portable terminal and the image processing device may be reduced.

A control method, a computer program, and a computer-readable recording medium in which the computer program is stored for the implementation of the above-described portable terminal are also novel and useful.

Other objects, features, and advantages will be apparent to persons of ordinary skill in the art from the following detailed description of the disclosure and the accompanying drawings.

DETAILED DESCRIPTION

Figure 1:
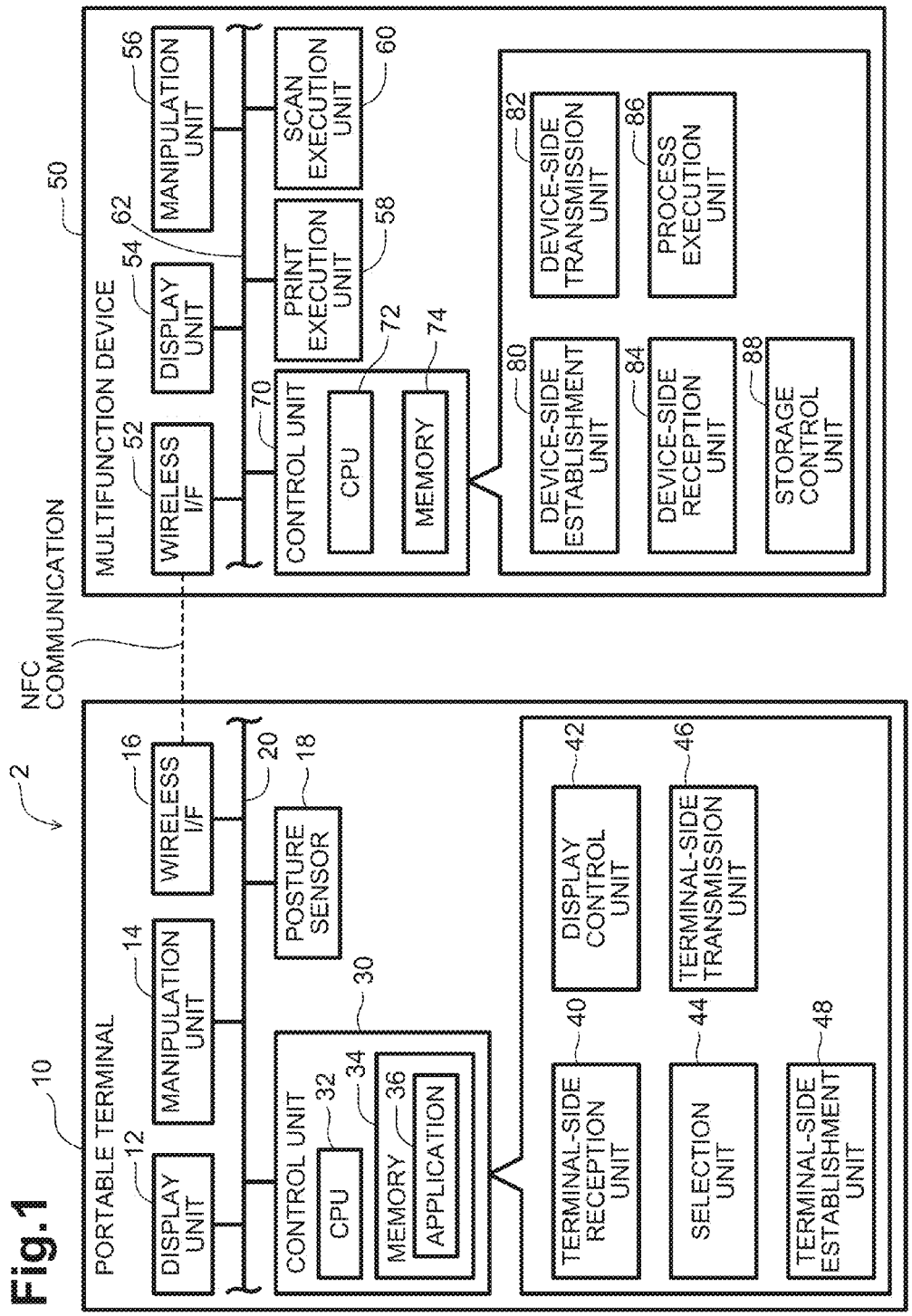
FIG. 1 illustrates an example configuration of a communication system.

As illustrated in FIG. 1, a communication system 2 is provided with a portable terminal 10 and a multifunction device 50. Bidirectional communication can be established between the portable terminal 10 and the multifunction device 50 using short-range wireless communication. The short-range wireless communication of the present embodiment may be Near Field Communication (NFC).

The portable terminal 10 is provided with a display unit 12, a manipulation unit 14, a wireless interface 16 (hereinafter, "wireless I/F 16"), a posture sensor 18, and a control unit 30. These components 12 to 30 may be connected to a data bus 20. The display unit 12 may include a display for displaying various kinds of information. The manipulation unit 14 may include one or more keys (e.g., keys on a keypad, virtual buttons on a touchscreen, etc.). The wireless I/F 16 may be an interface for carrying out wireless communication, such as NFC communication, with a wireless I/F 52 of the multifunction device 50 which will be described later. The posture sensor 18 may detect the posture (e.g., orientation) of the portable terminal 10. For example, the posture sensor 18 may detect whether the portable terminal 10 is tilted and in which direction and by how much. In particular, the posture sensor 18 may detect a rotation angle. Further, the posture sensor 18 may output a signal indicating the posture to the control unit 30. The posture sensor 18 may be, for example, a gyro sensor.

The control unit 30 may be provided with a central processing unit (CPU) 32 and memory 34. The CPU 32 may perform various processes in accordance with programs, comprising computer-executable instructions, stored in the memory 34. The memory 34 may include, for example, ROM and RAM. The memory 34 may be used to store the programs executed by the CPU 32, data acquired or generated when the CPU 32 executes the processes, and/or other data. The memory 34 may be used to store an application 36, comprising computer-executable instructions, for communicating with the multifunction device 50. The application 36 may be installed from outside the portable terminal 10 (e.g., a server provided by a vendor of the multifunction device 50) or may be stored in the memory 34 as the portable terminal 10 is shipped. As shown in FIG. 1, the control unit 30 may function as a terminal-side reception unit 40, a display control unit 42, a selection unit 44, a terminal-side transmission unit 46, and a terminal-side establishment unit 48. For example, each function of the terminal-side reception unit 40, the display control unit 42, the selection unit 44, the terminal-side transmission unit 46, and the terminal-side establishment unit 48 may be implemented when the CPU 32 executes processes in accordance with the application 36.

Figure 2:
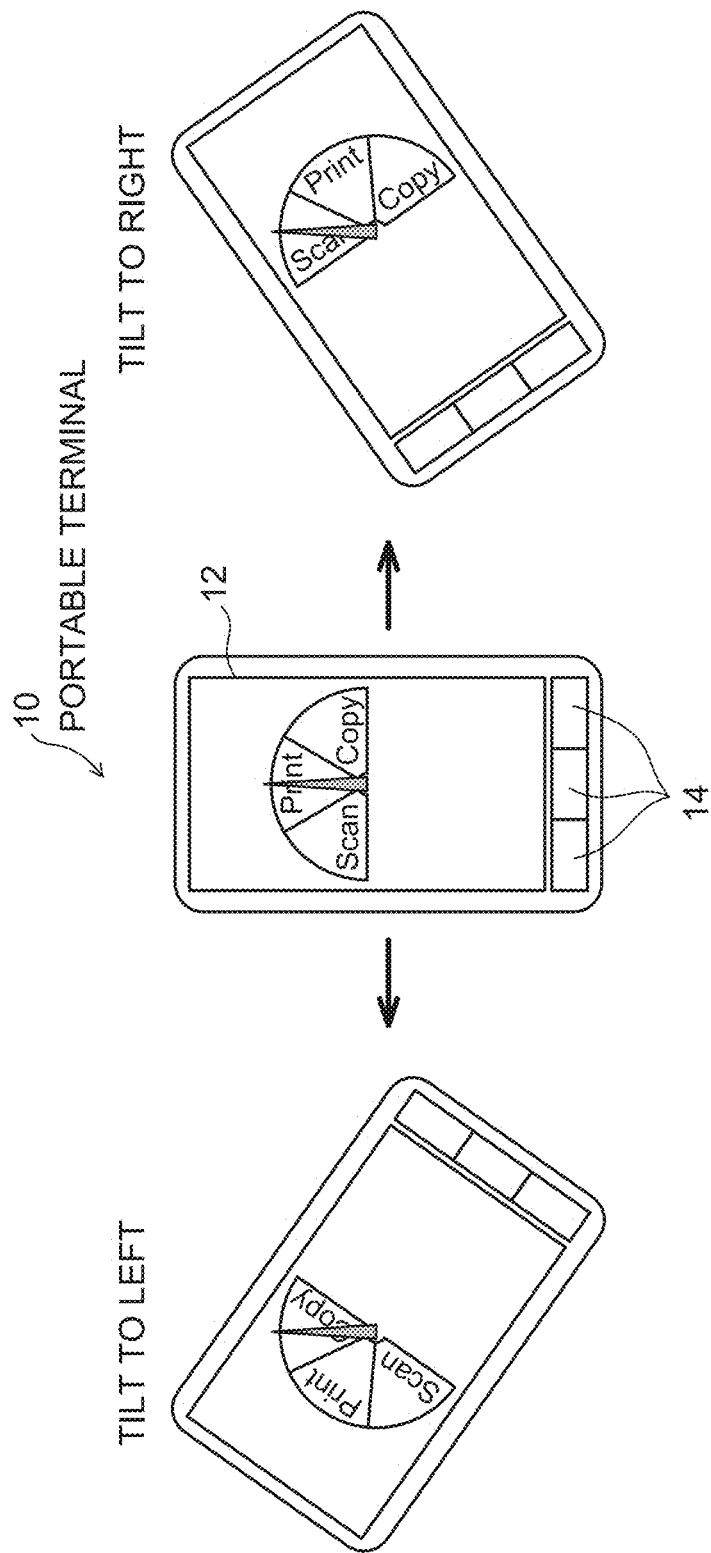
FIG. 2 illustrates an example state in which a portable terminal is tilted.

As illustrated in FIG. 2, the display unit 12 and the manipulation unit 14 may be disposed on one surface of the portable terminal 10. The user can change the content of the display screen of the display unit 12 by tilting the portable terminal 10. In an example of FIG. 2, a selection screen (i.e., a screen for selecting a print function, a copy function, and a scan function), which will be described later, is displayed on the display unit 12. In the central diagram of FIG. 2, the portable terminal 10 is not tilted to the right or the left, and the print function is designated by an arrow.

In a state in which the print function is designated, when the user moves the entire portable terminal 10 (e.g., rotates or tilts the portable terminal 10 to the right or the left), a signal output to the control unit 30 from the posture sensor 18 may change. Therefore, the posture sensor 18 may notify the display control unit 32 that the portable terminal 10 has been moved and a direction or rotation of the movement. For example, the posture sensor 18 may output a signal indicating whether the portable terminal has been tilted to the right or the left (or front and back). Then, the display control unit 32 may cause the displayed content of the selection screen to change so that the scan function or the copy function is identified as an intended selection. For example, the selection screen may be updated to point the arrow at either the scan setting or copy setting (see the right or left diagrams of FIG. 2). Thus, in the present embodiment, the user can designate a desired setting option by moving the entire portable terminal 10.

The multifunction device 50 can execute various functions including the print function, the scan function, and the copy function. The multifunction device 50 may be provided with a wireless I/F 52, a display unit 54, a manipulation unit 56, a print execution unit 58, a scan execution unit 60, and a control unit 70. Each of the units 52 to 70 may be connected to a data bus 62. The wireless I/F 52 may be an interface for carrying out NFC communication with the above-described wireless I/F 16. The display unit 54 may be a display for displaying various kinds of information. The manipulation unit 56 may include one or more keys (e.g., keys on a keypad, virtual buttons on a touchscreen, etc.). The print execution unit 58 may be provided with a printing mechanism, such as inkjet or laser printing system, and may perform printing in accordance with instructions from the control unit 70. The scan execution unit 60 may be provided with a scanning mechanism, such as a charge coupled device (CCD) or contact image sensor (CIS), and may perform scanning in accordance with instructions from the control unit 70.

The control unit 70 may be provided with a CPU 72 and memory 74. The CPU 72 may perform various processes in accordance with programs, comprising computer-executable instructions, stored in the memory 74. The memory 74 may include, for example, ROM, RAM, and hard disk. The memory 74 may be used to store the programs executed by the CPU 72, data acquired or generated when the CPU 72 executes the processes, and/or other data. As shown in FIG. 1, the control unit 70 may function as a device-side establishment unit 80, a device-side transmission unit 82, a device-side reception unit 84, a process execution unit 86, and a storage control unit 88. For example, each function of the device-side establishment unit 80, the device-side transmission unit 82, the device-side reception unit 84, the process execution unit 86, and the storage control unit 88 may be implemented when the CPU 72 executes processes in accordance with the programs described herein.

Figure 3:
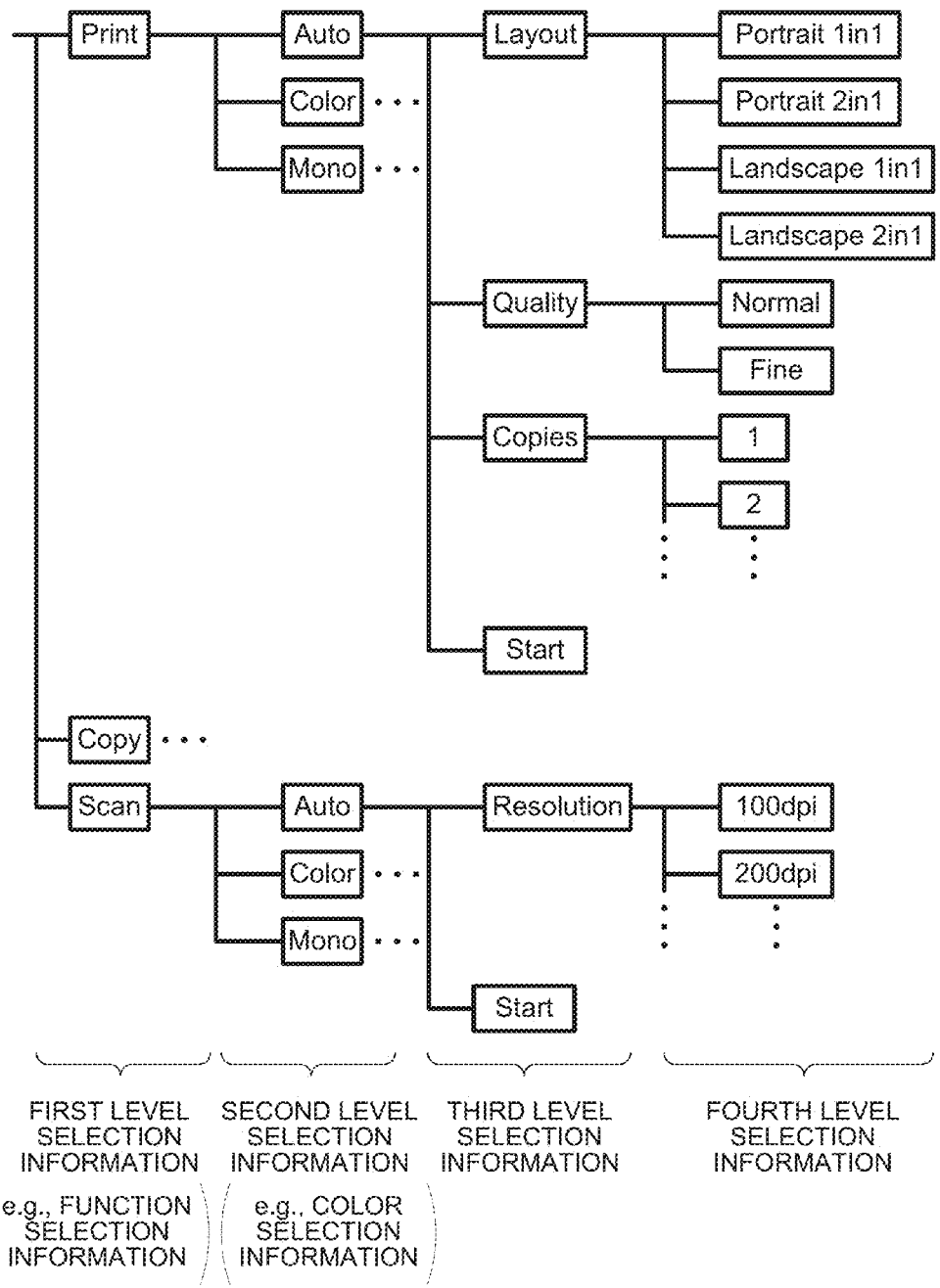
FIG. 3 illustrates an example hierarchical relationship of setting options.

The memory 74 of the multifunction device 50 may be used to store various kinds of selection information for selecting various setting options for the portable terminal 10. In particular, the memory 74 may be used to store one or more levels of selection information (e.g., function selection information, color selection information), as illustrated in FIG. 3.

The first level selection information may include function selection information, which may include three pieces of display data: "Print," "Copy," and "Scan".

The second level selection information may include color selection information. As shown in FIG. 3, the color selection information is lower-level information of the function selection information. The color selection information may include three pieces of display data for displaying "Auto," "Color," and "Mono." As shown, "Auto," "Color," and "Mono" may be lower-level information of each of "Print," "Copy" and "Scan". "Color" and "Mono" of the color selection information for "Print" may correspond to a color print function and a monochrome print function, respectively. "Auto" of the color selection information for "Print" may correspond to an automatic color printing function which detects, in accordance with data to be printed, the number of colors (i.e., color or monochrome) automatically and carries out printing in accordance with the detected number of colors. Similarly, the color selection information for "Copy" may correspond to an automatic color copy function, a color copy function, and a monochrome copy function. The color selection information for "Scan" may correspond to an automatic color scan function, a color scanning function, and a monochrome scanning function.

The third level selection information may be lower-level information of the second level selection information (e.g., color selection information). The third level selection information may include four pieces of display data: "Layout," "Quality," "Copies," and "Start." These four pieces may be lower-level information of the color selection information (i.e., "Auto", "Color", "Mono") for both "Print" and "Copy". "Layout" may correspond to a print layout. "Quality" may correspond to an image quality of printing. "Copies" may correspond to a number of copies to be printed. "Start" may correspond to a trigger to start printing.

The third level selection information may further include other pieces of display data, such as "Resolution" and "Start," as lower-level information of the color selection information for "Scan" (i.e., "Auto", "Color", and "Mono"). "Resolution" may correspond to a scan resolution. "Start" may correspond to a trigger to start scanning The fourth level selection information is lower-level information of the third level selection information. The fourth level selection information may include four pieces of display data, for example, "Portrait 1-in-1", and "Landscape 2-in-1," as lower-level information of "Layout". "Portrait 1-in-1" may correspond to portrait printing of an image of one page on one print sheet, and "Landscape 2-in-1" may correspond to landscape printing of two pages on one print sheet.

The fourth level selection information may further include two other pieces of display data, "Normal" and "Fine," as lower-level information of "Quality". "Normal" may correspond to normal image quality. "Fine" may correspond to higher image quality than normal image quality. The fourth level selection information may further include other pieces of display data representing values of the number of copies to be printed, such as "1" and "2", as lower-level information of "Copies". The fourth level selection information may further include other pieces of display data representing values of scan resolution to be used when scanning, such as "100 dpi" and "200 dpi", as lower-level information of "Resolution". Also, as shown in FIG. 3, lower-level information of "Start" may not exist.

As described above, in the present embodiment, each piece of selection information may include a plurality of pieces of display data representing a plurality of setting options, respectively. Herein, the display data may be, for example, text data and/or image data. Text data may include data for a string of characters identifying a particular setting option. For example, a piece of text data may include the word "Copy" representing a copy function that may be selected. In some embodiments, the display data may be text data for the purpose of reducing the amount of data that is transmitted between the portable terminal 10 and the multifunction device 50. In other words, the display data used may be text data because the amount of data for displaying text to represent each piece of selection information may be smaller than the amount of data for displaying an image to represent each piece of selection information. Thus, by using text data to represent each piece of selection information, communication time between, for example, the portable terminal 10 and the multifunction device 50 may be shortened.

Next, a portable terminal process carried out by the portable terminal 10 will be described. The portable terminal process is started by the user manipulating the manipulation unit 14 and starting the application 36 stored in the memory 34.

In S10, the terminal-side establishment unit 48 may monitor a communication status of the portable terminal 10. For example, the terminal-side establishment unit 48 may determine whether an NFC communication session is established between the portable terminal 10 and the multifunction device 50. The NFC communication is a short-range wireless communication using radio waves of a band of approximately 13.56 MHz. When the user of the portable terminal 10 moves the portable terminal 10 close to the multifunction device 50 within the radio wave range of the portable terminal 10 and the multifunction device 50 (e.g., 10 cm), the terminal-side establishment unit 48 may establish the NFC communication session. A method of establishment of the NFC communication session is described in, for example, Japanese Unexamined Patent Application Publication No. 2004-364145.

When the NFC communication session is established, the terminal-side establishment unit 48 may determine that the result of S10 is YES, and the routine proceeds to S12. In S12, the terminal-side transmission unit 46 may transmit information for requesting function selection information (see FIG. 3) to the multifunction device 50 using the NFC communication session established in S10.

Subsequently, in S14, the terminal-side reception unit 40 may receive the function selection information from the multifunction device 50 using the NFC communication session established in S10. Upon reception of the function selection information, the control unit 30 may notify the user that the reception has been completed (here, the function selection information has been received). For example, at S15, the control unit 30 may cause the portable terminal 10 to ring, vibrate, flash a light, etc. With the notification in S15, the user knows that the portable terminal 10 can be moved away from the multifunction device 50. When the distance between the portable terminal 10 and the multifunction device 50 becomes greater than the radio wave range of the portable terminal 10 and the multifunction device 50, the NFC communication session established in S10 is disconnected. However, where the function selection information is received before the disconnection occurs, the user may operate the portable terminal 10 to make selections even when the portable terminal 10 is outside the range for communicating with the multifunction device 50.

Next, in S16, the display control unit 42 may generate a selection screen using three kinds of display data (e.g., text data for displaying "Print", "Copy", and "Scan") included in the function selection information received in S14. The application 36 may include template data for generating the selection screen (i.e., data representing a sector in FIG. 2). The display control unit 42 may write each text (e.g., "Print") in three areas obtained by dividing the sector into three, and may control an arrow to point at "Print". Therefore, the selection screen illustrated in the central diagram of FIG. 2 (i.e., the selection screen in which three setting options are illustrated) may be obtained. Next, the display control unit 42 may cause the generated selection screen to be displayed on the display unit 12.

If the user wants to designate the setting option, the user may move the entire portable terminal 10 (e.g., may tilt or rotate the portable terminal 10). In this case, the posture sensor 18 may detect the change of posture of the portable terminal 10, and may output the detection result to the control unit 30. In this case, the display control unit 42 may determine that the result of S18 is YES, and the routine may return to S16. When returning to S16, the display control unit 42 may generate a new selection screen with an arrow pointing in a different direction (e.g., a selection screen which includes an arrow pointing at "Copy") in accordance with the output of the posture sensor 18, and may cause the new selection screen to be displayed on the display unit 12. By updating the selection screen, the user may be informed of the setting option being designated. S18 may cause S16 to be repeated a number of times until the portable terminal 10 stops changing position and/or In some embodiments, the display control unit 42 may cause the color of the designated setting option to differ from the color of the rest of the setting options, and/or may cause the size of the designated setting option to differ from the size of the rest of the setting options. Thus, the display control unit 42 may cause the selection screen to be displayed on the display unit 12 in a manner in which the designated setting option can be recognized by the user.

When a determination that the position of the portable terminal 10 has not changed is made in S18, the process may proceed to S20. In some embodiments, this determination will be made if the portable terminal maintains a position for a predetermined time period. For example, if the portable terminal 10 remains tilted to the left for a predetermined time period, the portable terminal 10 may lock in that position and S18 may determine that the position has not changed thereby proceeding to S20.

Figure 4:
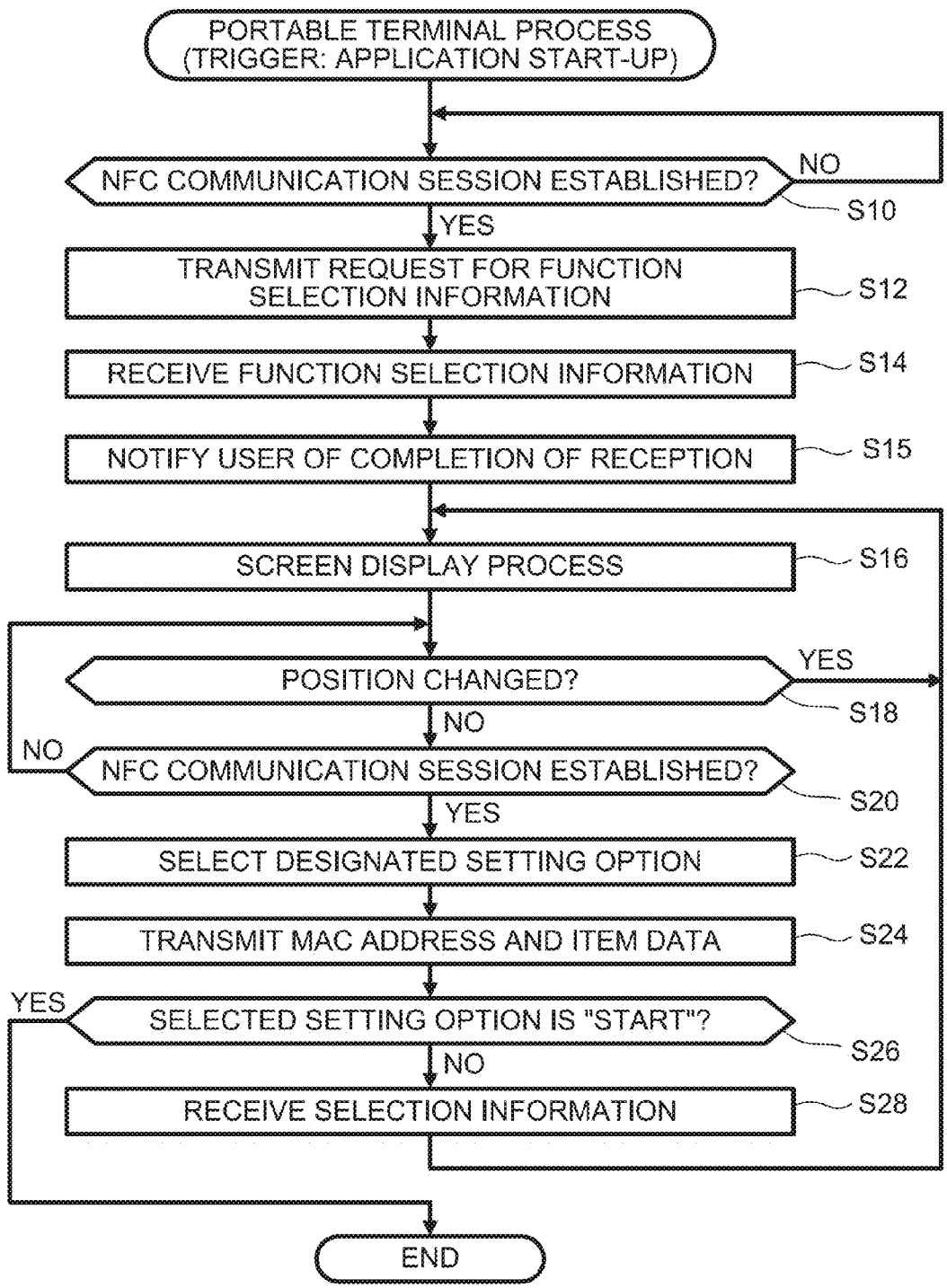
FIG. 4 illustrates an example flowchart of a portable terminal process of a first embodiment.

At S20, the portable terminal 10 may determine whether a communication session is established. The user may move the portable terminal 10 close to the multifunction device 50 in a state in which a desired setting option (e.g., "Copy") is selected. As described in S10, when the portable terminal 10 and the multifunction device 50 are located within the radio wave range of the portable terminal 10 and the multifunction device 50, the terminal-side establishment unit 48 may establish the NFC communication session. As shown in FIG. 4, S18 may be repeated until it is determined that a communication session is established. Accordingly, the most recent position of the portable terminal 10 may be obtained so that the proper selection may be received. Upon establishment of the NFC communication session, the terminal-side establishment unit 48 determines that the result of S20 is YES. In this case, the routine proceeds to S22. In some embodiments, where the communication session established in S10 has not been disconnected (e.g., where the portable terminal has not been moved out of range from the multifunction device 50), S20 may check to make sure that the communication session is still established. If it is still established, the process may proceed to S22.

In S22, the selection unit 44 may select the setting option pointed by the arrow on the selection screen (i.e., the setting option designated by the user). In this manner, the selection unit 44 can select the setting option designated by the user in accordance with the posture (e.g., orientation) of the portable terminal 10 detected by the posture sensor 18. In the present embodiment, the selection unit 44 can automatically select the setting option designated by the user with the establishment of the NFC communication session as a trigger even if the manipulation unit 14 is not manipulated by the user.

Subsequently, in S24, the terminal-side transmission unit 46 may transmit a MAC address of the portable terminal 10, and item data which represents the setting option selected in S22 (e.g., "Copy") to the multifunction device 50 using the NFC communication session established in S20. Hereinafter, the MAC address of the portable terminal 10 will be referred to as "M10".

In S26, the selection unit 44 may determine whether or not the setting option selected in S22 is "Start" which may be included in the third level selection information. If the selecting option selected in S22 is not "Start" (S26: NO), the routine may proceed to S28.

In S28, the terminal-side reception unit 40 may receive the selection information from the multifunction device 50 using the NFC communication session established in S20. The terminal-side reception unit 40 may receive the lower-level selection information of the selection information which is received the last time from the multifunction device 50. For example, as illustrated in FIG. 3, if the selection information received the last time from the multifunction device 50 is the function selection information, the terminal-side reception unit 40 may receive the color selection information in S28. If the selection information received last time from the multifunction device 50 is the fourth level selection information, no lower-level selection information may exist. In this case, the terminal-side reception unit 40 may receive the third level selection information in S28.

After the process of S28, the control unit 30 may cause the portable terminal 10 to, for example, ring in S15. This notifies the user that the reception has been completed (here, the lower-level selection information of the selection information received last time has been received). With the notification in S15, the user knows that the portable terminal 10 can be moved away from the multifunction device 50. If the portable terminal 10 moves out of communication range from the multifunction device 50, the NFC communication session established in S20 may be disconnected.

In subsequent S16, using selection information received by S28, display control unit 42 may generate a new selection screen (e.g., a selection screen in which "Auto", "Color", and "Mono" are displayed), and may cause the new selection screen to be displayed on the display unit 12. The remaining steps (e.g., steps after S18) may be the same as those described above. If it is determined that the result of S26 is YES, the portable terminal process may be completed.

Subsequently, the multifunction device process carried out by the multifunction device 50 will be described. In S40, the device-side establishment unit 80 may monitor whether or not the NFC communication session is established. If the NFC communication session is established (S40: YES), the routine may proceed to S42.

In S42, the device-side reception unit 84 may determine whether or not information to request the function selection information has been received from the portable terminal 10 using the NFC communication session established in S40 (see S12 of FIG. 4). If the information has been received, the device-side reception unit 84 may determine that the result of S42 is YES and the routine may proceed to S44. If the information has not been received, the device-side reception unit 84 may determine that the result of S42 is NO and the routine may proceed to S46.

In S44, device-side transmission unit 82 may transmit the function selection information to the portable terminal 10 using the NFC communication session established in S40, and the routine may return to S40. Although not illustrated in the flowchart, when the function selection information is transmitted in S44, the NFC communication session established in S40 may be disconnected. In some embodiments, in S44, the device-side transmission unit 82 may transmit the function selection information and additional lower-level selection information, such as the color selection information. Thus, in some embodiments, the device-side transmission unit 82 may transmit more information than requested by the portable terminal 10.

In S46, the device-side reception unit 84 may determine whether or not the MAC address "M10" of the portable terminal 10 and the item data have been received from the portable terminal 10 using the NFC communication session established in S40 (see S24 of FIG. 4). If the device-side reception unit 84 receives the MAC address "M10" and/or the item data, it may be determined that the result of S46 is YES and the routine may proceed to S48. If the device-side reception unit 84 determines that the MAC address "M10" and/or the item data have not been received, it may be determined that the result of S46 is NO and the routine may proceed to S42.

In S48, the device-side reception unit 84 may determine whether or not the setting option represented by the item data received in S46 is "Start". If the setting option is not "Start", the device-side reception unit 84 may determine that the result of S48 is NO, and the routine may proceed to S50. If the setting option is "Start", the device-side reception unit 84 may determine that the result of S48 is YES, and the routine may proceed to S54.

In S50, the storage control unit 88 may correlate the MAC address "M10" with the item data which are received in S46, and may cause the correlated MAC address "M10" and the item data to be stored in the memory 74. In steps to carry out the process of S50 for the second time and afterwards, the "M10" and the item data may already be stored in the memory 74. Therefore, in the process of S50 for the second time and afterwards, the storage control unit 88 may further correlate the "M10" with the item data which have already been stored in the memory 74, and may cause the item data newly received to be stored in the memory 74 in S46.

Next, in S52, the device-side transmission unit 82 may transmit the lower-level selection information of the setting option represented by the item data received in S46 to the portable terminal 10 using the NFC communication session established in S40. For example, if the item data received in S46 represents "Copy", the device-side transmission unit 82 may transmit the color selection information to the portable terminal 10 in S52. Then, if the item data received in S46 represents "Mono," the device-side transmission unit 82 may transmit the third level selection information including, for example, "Layout" to the portable terminal 10 in S52. Then, if the item data received in S46 represents "Copies", the device-side transmission unit 82 may transmit the fourth level selection information including, for example, "1" or "2" which represents the number of copies, to the portable terminal 10 in S52. Then, if the item data received in S46 represents "3" and no lower-level selection information exists, then the device-side transmission unit 82 may again transmit the third level selection information including, for example, "Layout" to the portable terminal 10 in S52. After the process of S52, the routine may proceed to S40.

In S54, the process execution unit 86 may read, from the memory 74, each piece of item data correlated with the MAC address "M10" received in S46. Next, the process execution unit 86 may perform image processing in accordance with each piece of read item data.

In some embodiments, "Copy" and "Mono" may be stored in the memory 74. In this example, item data representing the layout, image quality, and the number of copies may not be stored in the memory 74. Thus, if a setting option not stored in the memory 74 exists, the process execution unit 86 may use default setting options (e.g., "Layout: Portrait 1-in-1", "Quality: Normal", and "Copies: 1") which are previously set in the multifunction device 50. In this example, the process execution unit 86 may perform the first image processing (e.g., issues an instruction to scan to the scan execution unit 60) to cause the scan execution unit 60 to carry out monochrome scanning of an original document at normal image quality (i.e., normal scan resolution). Next, the process execution unit 86 may perform second image processing (e.g., a halftoning process) to generate print data for 1-in-1 portrait printing in accordance with the scanning data obtained by the monochrome scanning Next, the process execution unit 86 may perform third image processing (e.g., supplies the print data to the print execution unit 58) to cause the print execution unit 58 to carry out printing in accordance with the print data. In this manner, the monochrome copy function may be implemented.

In some embodiments, "Print" and "Color" may be stored in the memory 74. In this case, the process execution unit 86 may perform the first image processing (e.g., a resolution conversion process to the normal print resolution, RGB-to-CMYK color conversion, and a halftoning process) to generate print data for 1-in-1 portrait printing at the normal print resolution in accordance with the data to be printed which has been designated by the user (e.g., the data acquired from an external storage unit, such as a USB memory connected to the multifunction device 50). Next, the process execution unit 86 may perform second image processing (e.g., supplies the print data to the print execution unit 58) to cause the print execution unit 58 to carry out printing in accordance with the print data. In this manner, the color print function may be implemented. In this example, in a state in which "Fine" is further stored in the memory 74, the process execution unit 86 may perform the resolution conversion process to increase the print resolution to be higher than the normal print resolution in the first image processing. In this example, in a state in which "Landscape 2-in-1" is further stored in the memory 74, the process execution unit 86 may generate the print data for 2-in-1 landscape printing in the first image processing.

As described above, in S54, the process execution unit 86 may perform image processing in accordance with each setting option represented by each piece of item data received in S46 (i.e., each setting option designated by the user of the portable terminal 10). After the process of S54, the multifunction device process may be completed.

Next, an example of the first embodiment will be described. When the user moves the portable terminal 10 close to the multifunction device 50, an NFC communication session S1 is established (S10 of FIG. 4: YES, S40 of FIG. 5: YES). In this case, the multifunction device 50 may transmit the function selection information (e.g., "Print") using the NFC communication session S1 (S44 of FIG. 5). Therefore, the portable terminal 10 may receive the function selection information during the NFC communication session S1 (S14 of FIG. 4).

When the user moves the portable terminal 10 away from the multifunction device 50, the NFC communication session S1 is disconnected. The portable terminal 10 may cause the selection screen which includes a plurality of setting options included in the function selection information to be displayed on the display unit 12 (S16 of FIG. 4). When the user changes the posture (or orientation) of the portable terminal 10, the portable terminal 10 may cause a new selection screen to be displayed on the display unit 12 with the arrow pointing in a different direction (S16 which is carried out by if YES at S18 of FIG. 4).

For example, when the user moves the portable terminal 10 close to the multifunction device 50 in a state in which "Copy" is designated, an NFC communication session S2 may be established (S20 of FIG. 4: YES, S40 of FIG. 5: YES). The establishment of the NFC communication session S2 may trigger the portable terminal 10 to select "Copy" (S22 of FIG. 4). Next, the portable terminal 10 may transmit the MAC address "M10" of the portable terminal 10 and the item data representing "Copy" to the multifunction device 50 using the NFC communication session S2 (S24 of FIG. 4). The multifunction device 50 may receive "M10" and the item data representing "Copy" from the portable terminal 10 using the NFC communication session S2 (S46 of FIG. 5: YES). The multifunction device 50 may correlate "M10" with the item data representing "Copy" and may cause the correlated "M10" and the item data representing "Copy" to be stored in the memory 74 (S50 of FIG. 5).

Figure 5:
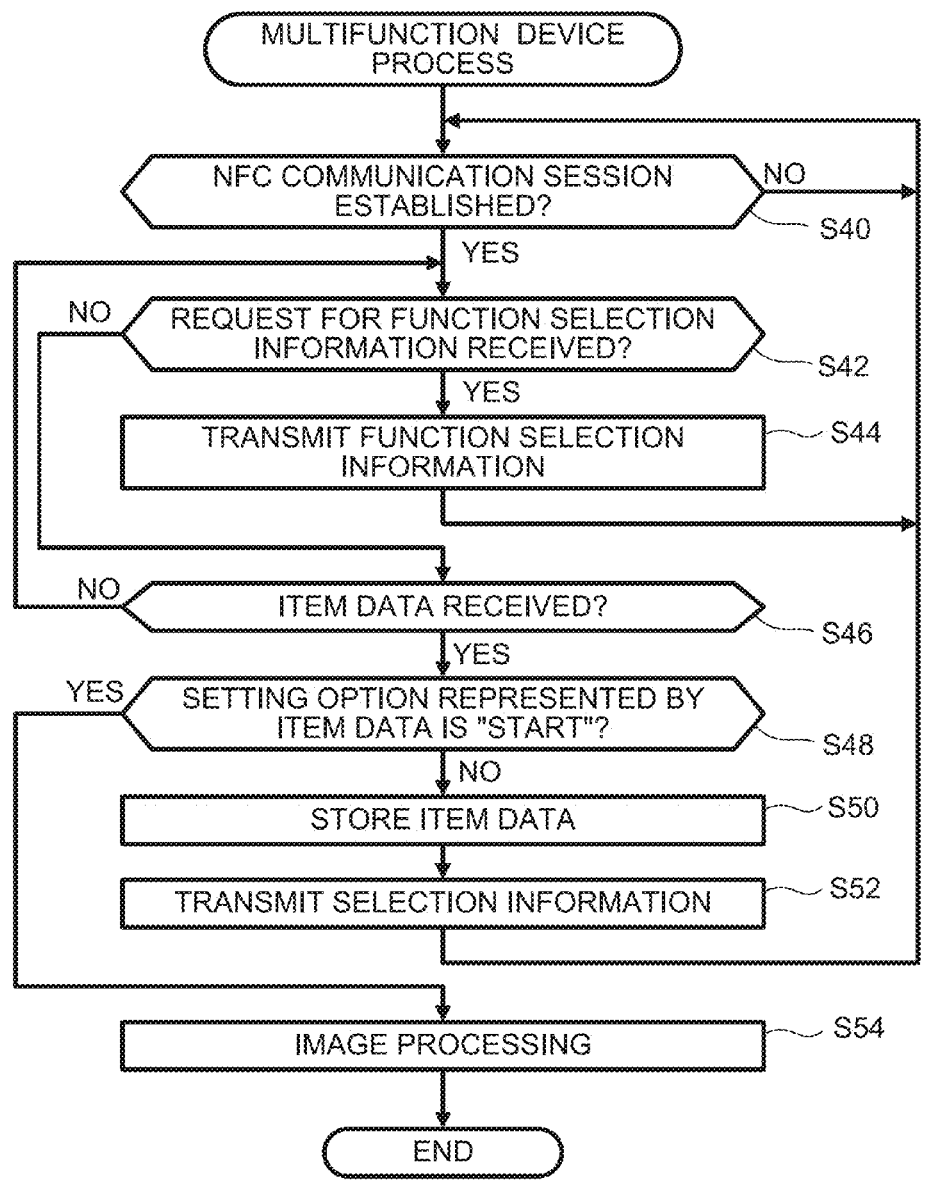
FIG. 5 illustrates an example flowchart of a multifunction device process of the first embodiment.

Next, the multifunction device 50 may transmit the color selection information (e.g., "Auto") to the portable terminal 10 using the NFC communication session S2 (S52 of FIG. 5). The portable terminal 10 may receive the color selection information using the NFC communication session S2 (S28 of FIG. 4). When the user moves the portable terminal 10 away from the multifunction device 50, the NFC communication session S2 may be disconnected. The portable terminal 10 may cause the selection screen which includes the plurality of setting options included in the color selection information to be displayed on the display unit 12 (S16 of FIG. 4).

For example, when the user moves the portable terminal 10 close to the multifunction device 50 in a state in which "Mono" is designated, an NFC communication session S3 may be established (S20 of FIG. 4: YES, S40 of FIG. 5: YES), and the establishment may trigger the portable terminal 10 to select "Mono" (S22 of FIG. 4). Next, the portable terminal 10 may transmit "M10" and item data representing "Mono" to the multifunction device 50 using the NFC communication session S3 (S24 of FIG. 4). The multifunction device 50 may receive "M10" and the item data representing "Mono" from the portable terminal 10 using the NFC communication session S3 (S46 of FIG. 5: YES). The multifunction device 50 may cause the item data representing "Mono" to be stored in the memory 74 in a correlated manner with the "M10" and the item data representing "Copy" which have already been stored (S50 of FIG. 5).

Figure 7:
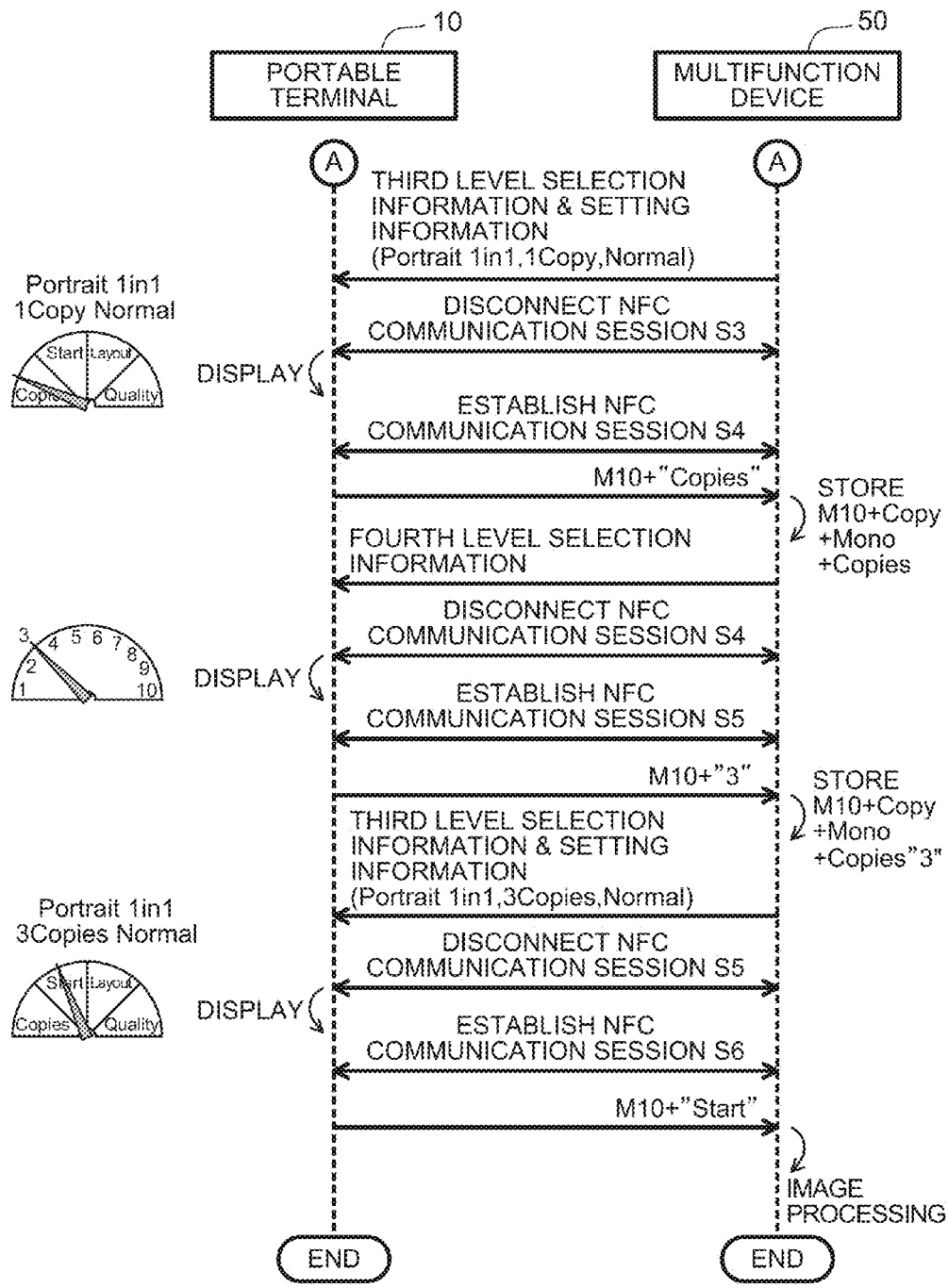
FIG. 7 illustrates an example sequence diagram continued from FIG. 6.

Next, as illustrated in FIG. 7, the multifunction device 50 may transmit "Copy" and the third level selection information (e.g., "Layout") corresponding to "Mono," and the setting information to the portable terminal 10 using the NFC communication session S3 (S52 of FIG. 5). Although not described in the flowcharts of FIGS. 4 and 5, the setting information may be information which represents previously determined default setting options from among the plurality of setting options included in the fourth level selection information. The portable terminal 10 may receive the third level selection information and the setting information using the NFC communication session S3 (S28 of FIG. 4). Then, the NFC communication session S3 may be disconnected. The portable terminal 10 may cause the selection screen which includes a plurality of setting options included in the third level selection information to be displayed on the display unit 12 (S16 of FIG. 4). Here, the portable terminal 10 may (i.e., the display control unit 42) further cause each setting option represented by the setting information (e.g., "Portrait 1-in-1") to be displayed on the selection screen. Then, by designating "Start", the user can instruct the multifunction device 50 to carry out the image processing in accordance with each setting option represented by the setting information.

For example, when the user moves the portable terminal 10 close to the multifunction device 50 in a state in which "Copies" is designated, an NFC communication session S4 may be established (S20 of FIG. 4: YES, S40 of FIG. 5: YES). In the same manner as described above, the portable terminal 10 may select "Copies" (S22 of FIG. 4), and transmit "M10" and the item data representing "Copies" to the multifunction device 50 (S24 of FIG. 4). The multifunction device 50 may cause the item data representing "Copies" to be stored in the memory 74 (S50 of FIG. 5).

The multifunction device 50 may transmit the fourth level selection information (e.g., "1" or "2") corresponding to "Copies" to the portable terminal 10 using the NFC communication session S4 (S52 of FIG. 5). Then, the NFC communication session S4 may be disconnected. The portable terminal 10 may cause the selection screen which includes a plurality of setting options included in the fourth level selection information to be displayed on the display unit 12 (S16 of FIG. 4).

For example, when the user moves the portable terminal 10 close to the multifunction device 50 in a state in which "3" is designated, an NFC communication session 55 may be established (S20 of FIG. 4: YES, S40 of FIG. 5: YES). In the same manner as described above, the portable terminal 10 may select "3" (S22 of FIG. 4), and may transmit "M10" and the item data representing "3" to the multifunction device 50 (S24 of FIG. 4). The multifunction device 50 may cause the item data representing "3" to be stored in the memory 74 (S50 of FIG. 5).

The multifunction device 50 may transmit the third level selection information (e.g., "Layout") and the setting information to the portable terminal 10 using the NFC communication session S5 (S52 of FIG. 5). In the setting information transmitted here, "1" which represents the default number of copies is changed to "3" represented by the item data received from the portable terminal 10. Then, the NFC communication session S5 may be disconnected. The portable terminal 10 may cause the selection screen to be displayed on the display unit 12 in the same manner as described above (S16 of FIG. 4). Since the number of copies represented by the setting information has been changed to "3", "3" may be displayed on the selection screen.

For example, when the user moves the portable terminal 10 close to the multifunction device 50 in a state in which "Start" is designated, an NFC communication session S6 may be established (S20 of FIG. 4: YES, S40 of FIG. 5: YES). In the same manner as described above, the portable terminal 10 may select "Start" (S22 of FIG. 4), and may transmit "M10" and the item data representing "Start" to the multifunction device 50 (S24 of FIG. 4). In this case, the multifunction device 50 may carry out the image processing in accordance with all the item data (i.e., "Copy", "Mono", "Copies", and "3") which are correlated with "M10" in the memory 74 (and other default setting options) (S54 of FIG. 5).

According to the present embodiment, the user can designate the setting option for carrying out the image processing in the multifunction device 50 using the portable terminal 10, and can transmit the item data to the multifunction device 50. Therefore, it is might not be necessary to provide a key for designating the setting option in the multifunction device 50. As a result, it may be possible to cause the multifunction device 50 to properly carry out the image processing in accordance with setting options represented by the item data using a smaller number of keys of the multifunction device 50.

Figure 6:
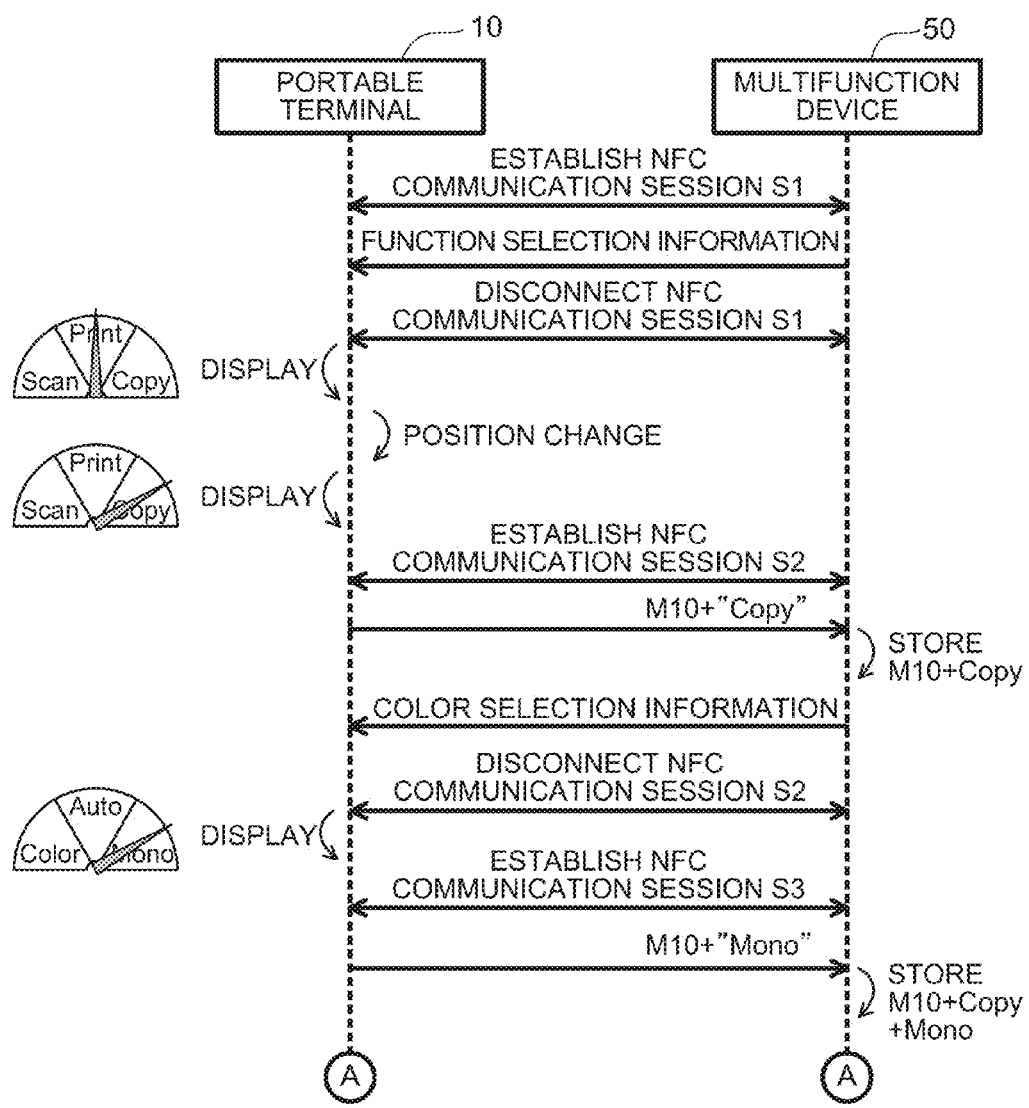
FIG. 6 illustrates an example sequence diagram of the first embodiment.

As illustrated in FIGS. 6 and 7, the user can designate one of the setting options from among the plurality of setting options by moving the entire portable terminal 10 even if the user does not manipulate the manipulation unit 14 of the portable terminal 10. Even if the manipulation unit 14 of the portable terminal 10 is not manipulated by the user, the portable terminal 10 may automatically select one setting option designated by the user upon establishment of the NFC communication session, and may transmit the item data representing the selected one setting option to the multifunction device 50. In this manner, the user can easily designate, using the portable terminal 10, the setting option for carrying out the image processing in the multifunction device 50, without manipulation of, for example, the keys.

After the function selection information is received using the NFC communication session S1, for example, the user can designate the setting option in a state in which the portable terminal 10 is moved away from the multifunction device 50 (i.e., a state in which the communication session S1 is disconnected). Therefore, the user can designate the setting option in an easier manner than in a configuration in which the user needs to designate the setting option in a state in which the portable terminal 10 is moved close to the multifunction device 50.

The portable terminal 10 transmits the MAC address "M10" of the portable terminal 10 and the item data representing the setting option to the multifunction device 50. Thus, the multifunction device 50 can correlate "M10" with the item data, and may cause the correlated "M10" and the item data to be stored in the memory 74. Therefore, even if the NFC communication session is disconnected, the multifunction device 50 can properly recognize the item data transmitted from the portable terminal 10 and, as a result, can properly carry out the image processing in accordance with the setting option represented by the item data.

The multifunction device 50 is an example of an "image processing device". The NFC communication session is an example of a "communication session of short-range wireless communication". The function selection information, the color selection information, the third level selection information, and the fourth level selection information are examples of various types of "selection information". For example, if the color selection information is an example type of "selection information", "Auto, Color, and Mono" are examples of "the plurality of setting options". In this case, "Color" selected in FIG. 6 is an example of a "particular setting option". The NFC communication session S2 is an example of a "first communication session" and the NFC communication session S3 is an example of a "second communication session".

Figure 8:
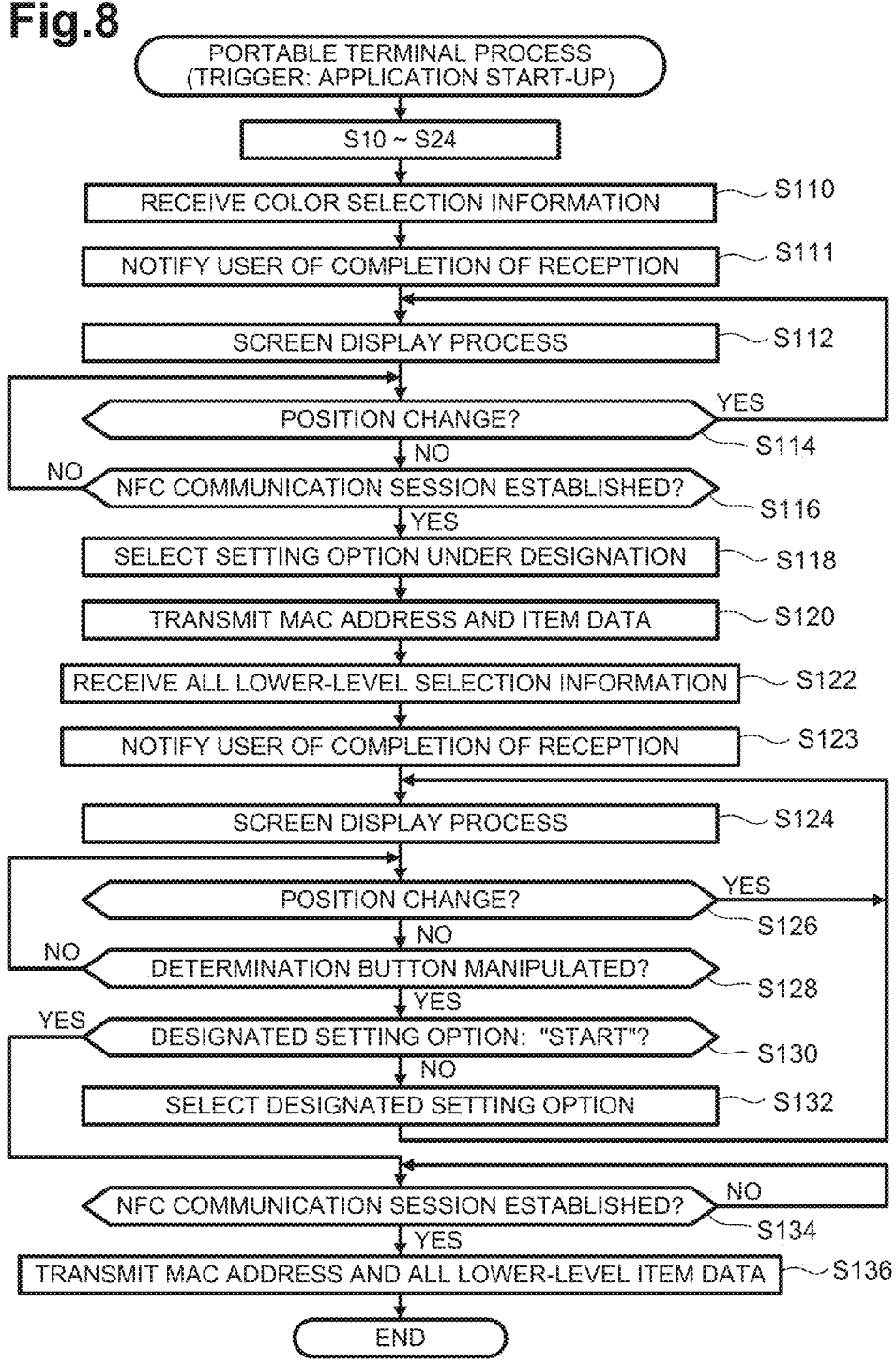
FIG. 8 illustrates an example flowchart of a portable terminal process of a second embodiment.

In another embodiment, a portable terminal process of FIG. 8 is carried out instead of the portable terminal process of FIG. 4. First, a control unit 30 may carry out processes of S10 to S24 of FIG. 4. Then, a terminal-side reception unit 40 may receive function selection information from a multifunction device 50 (S14 of FIG. 4). A selection unit 44 may select a setting option (e.g., "Copy") designated by the user with the establishment of the NFC communication session as a trigger (S22). A terminal-side transmission unit 46 may transmit item data representing the selecting option selected in S22 (e.g., "Copy") to the multifunction device 50 (S24). In S110, the terminal-side reception unit 40 may receive color selection information from the multifunction device 50.

Processes of S111 to S120 may be similar to those of S15 to S24 of FIG. 4. The selection unit 44 may select a setting option (e.g., "Mono") designated by the user with the establishment of the NFC communication session as a trigger (S118). The terminal-side transmission unit 46 may transmit item data representing the selecting option selected in S118 (e.g., "Mono") to the multifunction device 50 (S120).

Next, in S122, the terminal-side reception unit 40 may receive, from the multifunction device 50, both the third and fourth level selection information corresponding to the selecting option selected in S118 using the communication session established in S116.

In S123, the control unit 30 may cause the portable terminal 10 to ring. Then, the user may be notified that reception (here, reception of all the lower-level selection information) is completed, and the user may move the portable terminal 10 away from the multifunction device 50. Then, the NFC communication session established in S116 may be disconnected. In S124, the display control unit 42 generates a selection screen using the third level selection information from among the third and fourth level selection information received in S122, and may cause the generated selection screen to be displayed on a display unit 12.

In the present embodiment, the manipulation unit 14 may include a determination button. The user can manipulate the determination button in a state in which a desired setting option included in the third level selection information has been designated. In this case, the selection unit 44 may determine that the result of S128 is YES, and the routine may proceed to S130. In S130, the selection unit 44 may determine whether or not the setting option designated in S128 is "Start". If the setting option is "Start" (S130: YES), the routine may proceed to S134. If the setting option is not "Start" (S130: NO), the routine may proceed to S132.

In S132, the selection unit 44 may select the setting option designated in S128 (e.g., "Copies"). Specifically, manipulation of the determination button may trigger the selection unit 44 to select the setting option. After the process of S132, the routine may proceeds to S124. In S124, the display control unit 42 may generate a selection screen using the fourth level selection information (e.g., "1" or "2") corresponding to the setting option selected in S132 (e.g., "Copies") from among the third and fourth level selection information received in S122, and may cause the generated selection screen to be displayed on a display unit 12. Then, the user can manipulate the determination button in a state in which the desired setting option included in the fourth level selection information is designated (S128: YES). In this case, at S132, the selection unit 44 may select the setting option designated in S128 (e.g., "3"), and the routine may return to S124. In S124, the selection screen corresponding to the third level selection information may be displayed again.

In S134, the terminal-side transmission unit 46 may stand by until an NFC communication session is established. When the NFC communication session is established (S134: YES), the terminal-side transmission unit 46 may transmit "M10" and the setting data which represents all the setting options selected in S132 to the multifunction device 50 in S136. As described above, in S132, the setting option included in the third level selection information (e.g., "Copies") and the setting option included in the fourth level selection information (e.g., "3") may be selected. In this case, in S136, the terminal-side transmission unit 46 may transmit, to the multifunction device 50, both the item data representing the setting option included in the third level selection information and the item data representing the setting option included in the fourth level selection information. After the process of S136, the portable terminal process may be completed.

Figure 9:
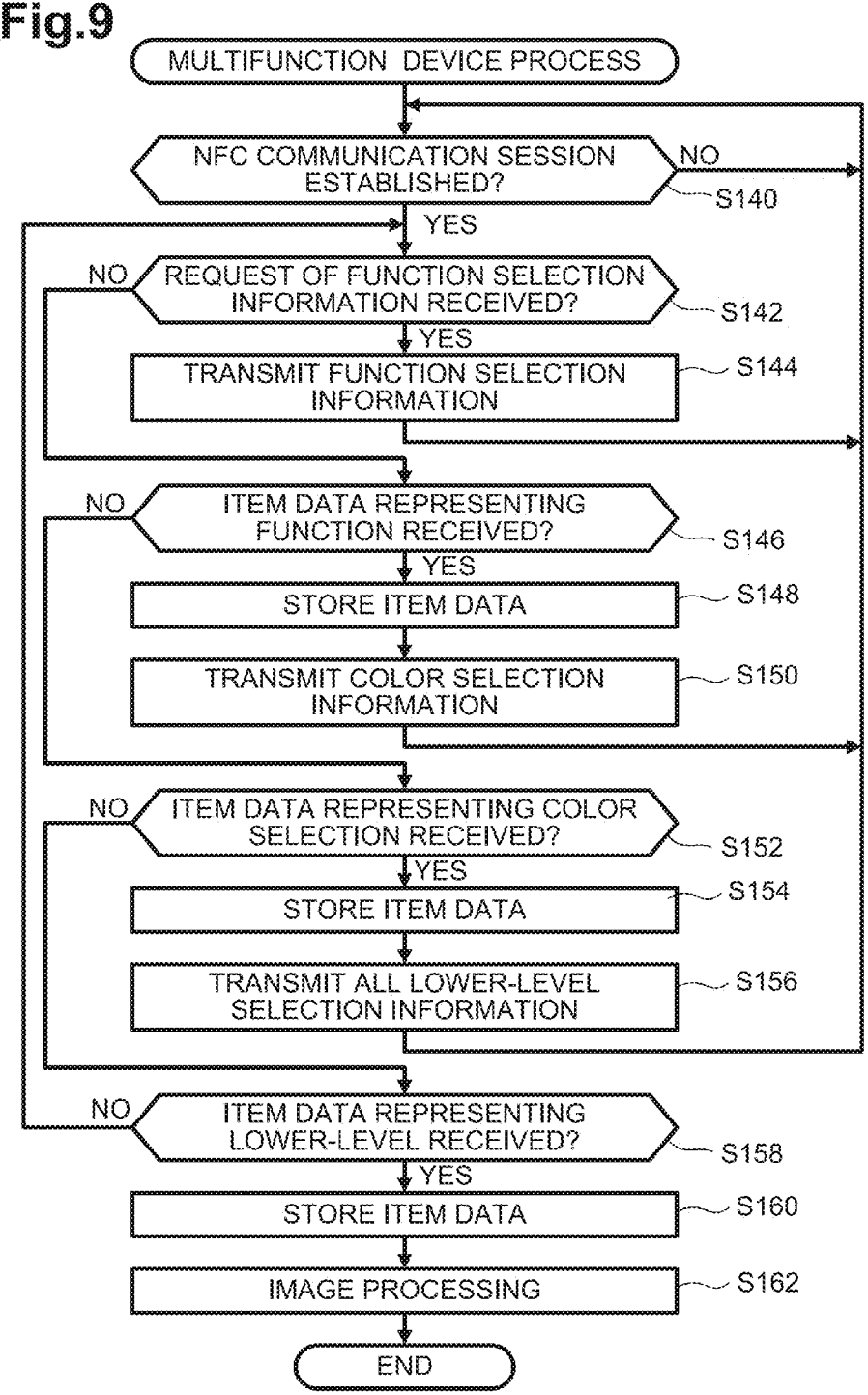
FIG. 9 illustrates an example flowchart of a multifunction device process of the second embodiment.

In yet another example embodiment, a multifunction device process of FIG. 9 may be carried out instead of the multifunction device process of FIG. 5. Processes of S140 to S144 may be similar to those of S40 to S44 of FIG. 5. In S146, a device-side reception unit 84 may determine whether or not the item data representing the setting option included in the function selection information has been received. If the determination result in S146 is YES, a storage control unit 88 may cause the item data received in S146 to be stored in memory 74 in S148. Next, in S150, a device-side transmission unit 82 may transmit the color selection information to the multifunction device 50.

In S152, the device-side reception unit 84 may determine whether or not the item data representing the setting option included in the color selection information has been received. If the determination result in S152 is YES, the storage control unit 88 may cause the item data received in S152 to be stored in the memory 74 in S154. Next, in S156, the device-side transmission unit 82 may transmit, to the multifunction device 50, the third and fourth level selection information which correspond to each lower-level setting option (e.g., "Copy" and "Mono") represented by each piece of item data received in S146 and S152.

In S158, the device-side reception unit 84 may determine whether or not the item data representing the setting option included in the third and fourth level selection information has been received (see S136 of FIG. 8). If the determination result in S158 is YES, the storage control unit 88 may cause the item data received in S158 to be stored in memory 74 in S160. Next, in S162, a process execution unit 86 may carry out image processing in a similar manner as in S54 of FIG. 5. After the process of S162, the multifunction device process may be completed.

Figure 10:
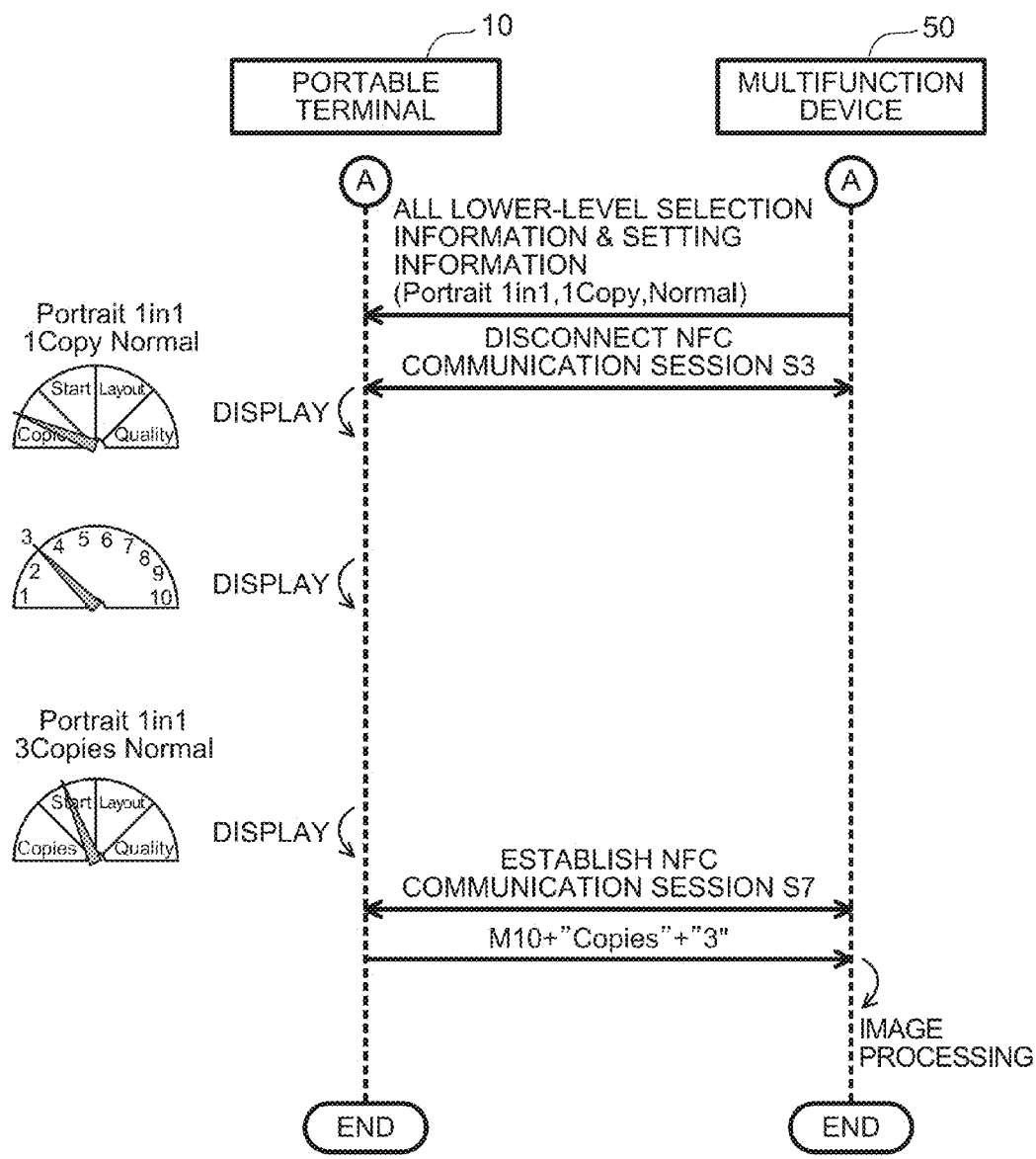
FIG. 10 illustrates an example sequence diagram of the second embodiment.

Next, an example of the second embodiment will be described with reference to FIG. 10. The processes may be similar to those of FIG. 6 until the multifunction device 50 causes the item data representing the setting option included in the color selection information to be stored. As illustrated in FIG. 10, the multifunction device 50 may transmit the third and fourth level selection information to the portable terminal 10 using a NFC communication session S3 (S156 of FIG. 9). Then, the NFC communication session S3 may be disconnected.

The portable terminal 10 may cause a selection screen which includes "Copy" and plural setting options (e.g., "Layout") included in the third level selection information corresponding to "Mono" to be displayed on the display unit 12 (S124 of FIG. 8). For example, the user may manipulate the determination button of the manipulation unit 14 in a state in which "Copies" is designated (S128 of FIG. 8: YES). In this case, the portable terminal 10 may cause a selection screen which includes a plurality of setting options (e.g., "1" and "2") included in the fourth level selection information corresponding to "Copies" to be displayed on the display unit 12 (S124 of FIG. 8).

For example, the user may manipulate the determination button of the manipulation unit 14 in a state in which "3" is designated (S128 of FIG. 8: YES). In this case, the portable terminal 10 may cause a selection screen which includes plural setting options (e.g., "Layout") included in the third level selection information to be displayed again on the display unit 12 (S124 of FIG. 8). Note that the number of copies "3" is displayed on the selection screen.

For example, the user manipulates the determination button of the manipulation unit 14 in a state in which "Start" is designated (S128 of FIG. 8: YES, S130 of FIG. 8: YES). Then, when the user moves the portable terminal 10 close to the multifunction device 50, an NFC communication session S7 may be established (S134 of FIG. 8: YES, S140 of FIG. 9: YES). The portable terminal 10 may transmit "M10", the item data representing "Copies", and the item data representing "3" to the multifunction device 50 using the NFC communication session S7 (S136 of FIG. 8). In this case, the multifunction device 50 may carry out image processing in accordance with all the item data (i.e., "Copy" and "Mono") correlated with "M10" in the memory 74 and in accordance with the item data received using the NFC communication session S7 (i.e., "Copies" and "3") (and other default setting options) (S162 of FIG. 9).

As illustrated in FIG. 10, the multifunction device 50 may transmit all the lower-level selection information (i.e., the third and fourth level selection information) to the portable terminal 10 using the NFC communication session S3. By using the determination button of the portable terminal 10, the user can designate one setting option from among the plural setting options included in the third level selection information, and can designate a particular setting option from among the plural setting options included in the fourth level selection information. According to the present embodiment, the user can reduce the number of operations to move the portable terminal 10 close to the multifunction device 50.

The third level selection information is an example type of "selection information" and the fourth level selection information is another example type of "selection information". Therefore, "1", "2", and so forth corresponding to the number of copies are examples of "a plurality of third setting options". The NFC communication session S3 is an example of a "second communication session" and the NFC communication session S7 is an example of a "third communication session".

Although the embodiments of the present invention have been described in detail, it is to be understood that the embodiments are illustrative only and, therefore, do not limit the scope of the claims. Various changes and modifications of the embodiments are within the techniques described in the claims. Modifications of the embodiments described above will be provided below.

The "image processing device" is not limited to the multifunction device 50. Indeed, other equipment that can carry out image processing (e.g., a printer, facsimile equipment, a copy machine, and a scanner) may be used. The "portable terminal" may be any device which is portable, such as, for example, a cellular phone, a smartphone, a PDA, a portable PC, a tablet PC, etc.

In the embodiments described above, the portable terminal 10 may be provided with the posture sensor 18 (e.g., the gyro sensor) which detects the orientation of the portable terminal 10 when the user tilts, rotates, or otherwise moves the portable terminal 10 to select the setting option. Instead of the posture sensor 18, the portable terminal 10 may be provided with, for example, an acceleration sensor which detects acceleration when the user shakes the portable terminal 10 to select the setting option. A "first operation" may be an operation to move the entire portable terminal 10, such as an operation to tilt, rotate, or shake the portable terminal 10.

In the embodiments described above, the portable terminal 10 and the multifunction device 50 may carry out NFC communication. Instead of the NFC communication, another communication system, such as Transfer Jet, may be used. Thus, another communication system, such as Transfer Jet, is an example of "short-range wireless communication". Further, any communication system having a short-range similar to the range of an NFC communication may be used.

In the embodiments described above, the MAC address of the portable terminal 10 may be used as example of identification information of the portable terminal 10. Instead of the MAC address, identification information of the portable terminal 10 may be arbitrary information generated by the portable terminal 10 (e.g., a random number) or any arbitrary information generated by the multifunction device 50 (e.g., a random number). If the identification information is generated by the portable terminal 10, the portable terminal 10 may transmit the identification information to the multifunction device 50 during the first communication session. In this case, the multifunction device 50 may cause the identification information to be stored at the time at which the function selection information is transmitted to the portable terminal 10.

When receiving the identification information and the item data, the multifunction device 50 may determine whether or not the received identification information corresponds to the identification information stored in the multifunction device 50 and, if the determination result is negative, may issue, for example, an error. Even if the determination result is affirmative, the multifunction device 50 may issue, for example, an error in a case in which the hierarchical relationship of the setting options is not maintained between the item data stored in the multifunction device 50 and the received item data. The multifunction device 50 may issue an error by itself or may transmit information about occurrence of an error and details of the error to the portable terminal 10 and cause the portable terminal 10 to issue an error.

In the first and second embodiments, each piece of item data received using each communication session is stored in the multifunction device 50 (S50 of FIGS. 5, S148, S154 and S160 of FIG. 9). However, each item data may be stored in the portable terminal 10 and not in the multifunction device 50. In this case, the terminal-side transmission unit 46 may transmit each piece of item data to the multifunction device 50, and might not transmit the identification information. In accordance with the received item data, the device-side transmission unit 82 may determine the next selection information and may transmit the determined selection information to the portable terminal 10. In this case, the terminal-side transmission unit 46 may transmit all the item data stored in the portable terminal 10 to the multifunction device 50 at the time of transmitting the last item data ("Start") to the multifunction device 50. The process execution unit 86 may carry out the image processing in accordance with all the received item data.

The hierarchical relationship of the setting options, the number of pieces of selection information, and the number of times that the selection information is transmitted in communication sessions may be determined arbitrarily. For example, after the item data of the function selection information (any of "Copy", "Print", and "Scan") is received, the device-side transmission unit 82 may transmit all the lower-level selection information corresponding to the received item data (e.g., "Copy") to the portable terminal 10. After transmitting the item data of the function selection information (e.g., "Copy"), the terminal-side reception unit 40 may receive all the lower-level selection information corresponding to the transmitted item data ("Copy"), and the display control unit 42 may cause the selection screen to be displayed in accordance with all the lower-level selection information. In this case, when "Start" is selected, the terminal-side transmission unit 46 may transmit all the selected lower-level item data to the multifunction device 50. The process execution unit 86 may carry out the image processing in accordance with all the received lower-level item data.

In the example embodiments described above, the units 40 to 48 and 80 to 88 may be implemented by software and/or by hardware, such as a logical circuit.

Although example embodiments are described above, the various features and steps may be combined, divided, omitted, rearranged, and/or augmented in any desired manner. For example, S15 may be omitted from the process of FIG. 4. Also, for example, S50 and S52 of FIG. 5 may be rearranged so that S52 is performed prior to S50. This disclosure should not be limited to the example embodiments described, but rather should have its scope determined by the claims that follow.

Further, the technical elements provided in the description or the drawings have technical application alone or in various combinations. Therefore, it is to be understood that the combinations of the claims at the filing are not restrictive. The technique provided in the description or the drawings may achieve one or more objectives.

What is claimed is:
1. An image processing device comprising:
a wireless interface configured to establish a bidirectional short-range wireless communication session with a portable terminal when the portable terminal is within a radio wave range of the image processing device;
a processor; and
a memory configured to store computer-readable instructions that, when executed by the processor, cause the image processing device to:
transmit first selection information to the portable terminal during a first short-range wireless communication session established by the wireless interface, the first selection information including information which represents a plurality of first setting options for image processing performed by the image processing device;
receive first item data from the portable terminal during a second short-range wireless communication session established after the first short-range wireless communication session is disconnected, the first item data representing a particular first setting option designated by a user of the portable terminal from among the plurality of first setting options; and perform image processing in accordance with the particular first setting option represented by the first item data, wherein a first communication system is used to transmit the first selection information during the first short-range wireless communication session and receive the first item data during the second short-range wireless communication session.

2. The image processing device according to claim 1, wherein the memory stores additional computer-readable instructions that, when executed by the processor, cause the image processing device to:

transmit second selection information to the portable terminal during the second short-range wireless communication session, the second selection information including information which represents a plurality of second setting options related to the particular first setting option;

receive second item data from the portable terminal during a third short-range wireless communication session established after the second short-range wireless communication session is disconnected, the second item data representing a particular second setting option designated by the user from among the plurality of second setting options; and perform the image processing further in accordance with the particular second setting option represented by the second item data.

3. The image processing device according to claim 2, wherein the memory stores additional computer-readable instructions, that when executed by the processor, cause the image processing device to:

transmit the second selection information and third selection information to the portable terminal during the second short-range wireless communication session, the third selection information including information which represents a plurality of third setting options related to the particular second setting option;

receive the second item data and third item data from the portable terminal during the third short-range wireless communication session, the third item data representing a particular third setting option designated by the user from among the plurality of third setting options; and perform the image processing further in accordance with the particular third setting option represented by the third item data.

4. The image processing device according to claim 2, wherein the plurality of second setting options comprises lower-level setting options of the particular first setting option.

5. The image processing device according to claim 2, wherein the memory stores additional computer-readable instructions, that when executed by the processor, cause the image processing device to:

receive, from the portable terminal, identification information for identifying the portable terminal communicating with the image processing device during the second short-range wireless communication session;

store the identification information and the first item data in a storage area of the image processing device in a manner in which the identification information and the first item data are correlated with each other;

receive the identification information from the portable terminal during the third short-range wireless communication session; and store the second item data in the storage area in a manner in which the second item data is correlated with the identification information and the first item data already stored in the storage area, wherein the image processing is performed by referring to the first item data and the second item data correlated with the identification information of the portable terminal in response to a start command received from the portable terminal.

6. The image processing device according to claim 1, wherein the first communication system is a near field communication system.

7. A non-transitory computer-readable storage medium storing computer-readable instructions that, when executed by a processor, cause an image processing device to:

transmit first selection information to a portable terminal during a first short-range wireless communication session which is established when the portable terminal is within a radio wave range of the image processing device, the first selection information including information which represents a plurality of first setting options for image processing performed by the image processing device;

receive first item data from the portable terminal during a second short-range wireless communication session established after the first short-range wireless communication session is disconnected, the first item data representing a particular first setting option designated by a user of the portable terminal from among the plurality of first setting options; and perform image processing in accordance with the particular first setting option represented by the first item data wherein a first communication system is used to transmit the first selection information during the first short-range wireless communication session and receive the first item data during the second short-range wireless communication session.

8. The non-transitory computer-readable storage medium of claim 7, storing additional computer-readable instructions that, when executed by the processor, further cause the image processing device to:

transmit second selection information to the portable terminal during the second short-range wireless communication session, the second selection information including information which represents a plurality of second setting options related to the particular first setting option;

receive second item data from the portable terminal during a third short-range wireless communication session established after the second short-range wireless communication session is disconnected, the second item data representing a particular second setting option designated by the user from among the plurality of second setting options; and perform the image processing further in accordance with the particular second setting option represented by the second item data.

9. The non-transitory computer-readable storage medium of claim 7, wherein the first communication system is a near field communication system.

10. A portable terminal comprising:

a wireless interface configured to establish a bidirectional short-range wireless communication session with an image processing device when the portable terminal is within a radio wave range of the image processing device;

a processor;

a display unit and a memory configured to store computer-readable instructions that, when executed by the processor, cause the portable terminal to:

receive first selection information from the image processing device during a first short-range wireless communication session, the first selection information including information which represents a plurality of first setting options for image processing performed by the image processing device;

display a first selection screen on the display unit of the portable terminal in accordance with the first selection information, the first selection screen displaying at least one first setting option from among the plurality of first setting options;

in a state in which the first short-range wireless communication session is disconnected, select a particular first setting option from among the plurality of first setting options when a user designates the particular first setting option from among the plurality of first setting options using the first selection screen; and transmit first item data to the image processing device during a second short-range wireless communication session established after the first short-range wireless communication session is disconnected, the first item data representing the particular first setting option, wherein a first communication system is used to receive the first selection information during the first short-range wireless communication session and transmit the first item data during the second short-range wireless communication session.

11. The portable terminal according to claim 10, wherein the first communication system is a near field communication system.

12. The portable terminal according to claim 10, wherein the memory stores additional computer-readable instructions that, when executed by the processor, cause the portable terminal to:

receive second selection information from the image processing device during the second short-range wireless communication session, the second selection information including information which represents a plurality of second setting options related to the particular first setting option;

display a second selection screen on the display unit in accordance with the second selection information, the second selection screen representing at least one second setting option from among the plurality of second setting options;

in a state in which the second short-range wireless communication session is disconnected, select a particular second setting option from among the plurality of second setting options when the user designates the particular second setting option from among the plurality of second setting options using the second selection screen; and transmit second item data to the image processing device during a third short-range wireless communication session established after the second short-range wireless communication session is disconnected, the second item data representing the particular second setting option.

13. The portable terminal according to claim 12, wherein the memory stores additional computer-readable instructions that, when executed by the processor, cause the portable terminal to:

transmit identification information for identifying the portable terminal to the image processing device during the second short-range wireless communication session; and transmit the identification information to the image processing device during the third short-range wireless communication session.

14. The portable terminal according to claim 12, wherein the memory stores additional computer-readable instructions that, when executed by the processor, cause the portable terminal to:

receive the second selection information and third selection information from the image processing device during the second short-range wireless communication session, the third selection information including information which represents a plurality of third setting options related to the particular second setting option;

display a third selection screen on the display unit in accordance with the third selection information, the third selection screen representing at least one third setting option from among the plurality of third setting options;

in a state in which the second short-range wireless communication session is disconnected, select a particular third setting option from among the plurality of third setting options when the user designates the particular third setting option from among the plurality of third setting options using the third selection screen; and transmit the second item data and third item data, which represents the particular third setting option, to the image processing device during the third short-range wireless communication session.

15. The portable terminal according to claim 10, wherein the memory stores additional computer-readable instructions that, when executed by the processor, cause the portable terminal to:

generate the first selection screen using a plurality of pieces of text data, wherein the plurality of pieces of text data represents the plurality of first setting options, respectively.

16. A non-transitory computer-readable storage medium storing computer-readable instructions that, when executed by a processor of a portable terminal, cause the portable terminal to:

receive first selection information from an image processing device during a first short-range wireless communication session, the first selection information including information which represents a plurality of first setting options for image processing performed by the image processing device;

display a first selection screen on a display unit of the portable terminal in accordance with the first selection information, the first selection screen displaying at least one first setting option from among the plurality of first setting options;

in a state in which the first short-range wireless communication session is disconnected, select a particular first setting option from among the plurality of first setting options when a user designates the particular first setting option from among the plurality of first setting options using the first selection screen; and transmit first item data to the image processing device during a second short-range wireless communication session established after the first short-range wireless communication session is disconnected, the first item data representing the particular first setting option, wherein a first communication system is used to receive the first selection information during the first short-range wireless communication session and transmit the first item data during the second short-range wireless communication session.

17. The non-transitory computer-readable storage medium of claim 16, wherein the first communication system is a near field communication system.

* * * * *